United States Patent

[11] 3,595,380

| [72] | Inventor | Eldon S. Miller<br>6645 S. W. 129th Terrace, Miami, Fla. 33156 |
|---|---|---|
| [21] | Appl. No. | 864,929 |
| [22] | Filed | Sept. 11, 1969 |
| [45] | Patented | July 27, 1971 |

[54] SPROCKET DRIVE, BELT RETAINER AND GUIDE MECHANISM FOR ARTICULATED LINK CONVEYOR BELTS
7 Claims, 5 Drawing Figs.

[52] U.S. Cl. .................................... 198/202,
198/195, 198/203
[51] Int. Cl. .................................... B65g 17/06,
B65g 15/62
[50] Field of Search .......................... 198/195,
202, 203, 204, 16, 189; 74/243, 243 C, 243 CS,
242.8, 242.12

[56] References Cited
UNITED STATES PATENTS
| 2,962,149 | 11/1960 | Hansen | 198/16 |
| 3,049,213 | 8/1962 | Fabula | 198/16 |
| 3,513,965 | 5/1970 | Miller | 198/195 |

*Primary Examiner*—Joseph Wegbreit
*Assistant Examiner*—Bruce H. Stoner, Jr.
*Attorney*—Ernest H. Schmidt ABSTRACT: A sprocket drive, belt retainer and guide mechanism for articulated link conveyor belts, the individual links of which are provided along their undersides with slide passageways of substantially T-shaped cross-sectional configuration and a pair of laterally spaced recesses for the reception of sprocket teeth, one on each side of said passageways, is described. A U-shaped guide member having an outer peripheral T-shaped track received in the belt link slide passageways guides the belt around the bight of the guide member, in which is transversely arranged a drive shaft carrying a pair of spaced sprocket wheels engaged in the sprocket teeth recesses of the belt links for moving the belt along the track in retaining relation with respect thereto.

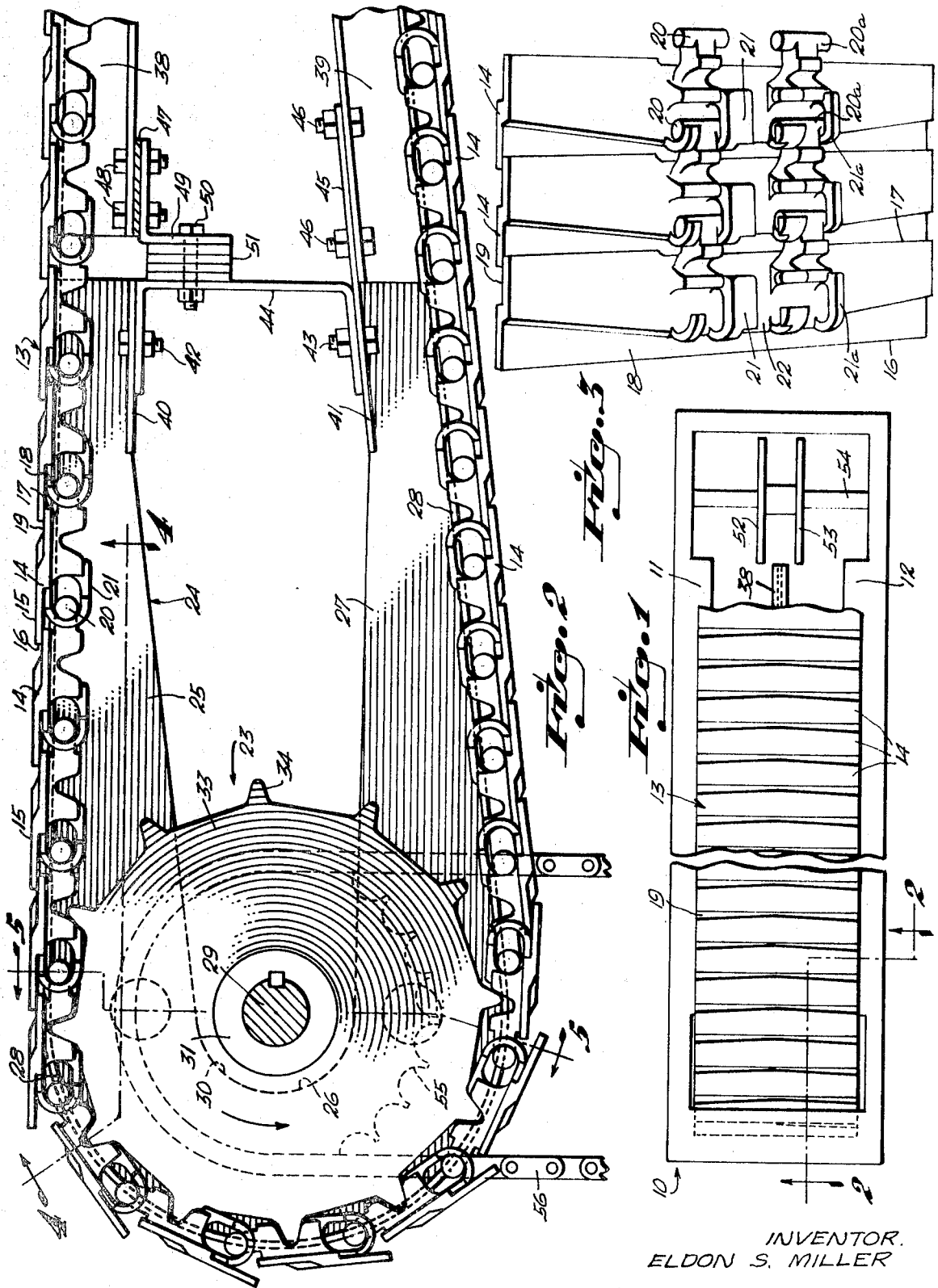

PATENTED JUL 27 1971

INVENTOR
ELDON S. MILLER

BY
ATTORNEY.

SPROCKET DRIVE, BELT RETAINER AND GUIDE MECHANISM FOR ARTICULATED LINK CONVEYOR BELTS

This invention relates to conveyor belts and is directed particularly to improvements in driving, retaining and guiding mechanism for articulated link conveyor belts of the type described in my patent application Ser. No. 769,248, filed Oct. 21, 1968, issued May 26, 1970 as U.S. Pat. No. 3,513,965, titled CONVEYOR AND LINK. In that application, there is described an integrally molded or cast conveyor link, a plurality of which can readily be assembled to provide an endless, articulated, beltlike conveyor of simplified construction and improved performance permitting extraordinary versatility of movement in its path of travel. The assembled links are also provided in their undersides with recesses adapted to receive sprocket teeth of a driving sprocket wheel, and guideway openings of T-shaped cross-sectional configuration cooperative with complementary guide tracks for retaining and guiding the conveyor link assembly along its path of travel. It is the principal object of this invention to provide a combination sprocket drive, retainer, guide and takeup mechanism for the driven end of articulated link conveyor belts of the character above described.

A more particular object is to provide a sprocket drive, retainer, guide and takeup mechanism for articulated conveyor belts which includes guide track mechanism along the return path extending from the driven sprocket for supporting the linkage assembly therealong in longitudinally bunched-together or compacted disposition, to accommodate the normal slack in the belt along the return or bottom path or flight, and which, at the same time, provides for positive drive without any need of idler takeup loops or resiliently stressed drive or return sprockets.

Still another object of the invention is to provide a sprocket drive, retainer and takeup device of the character described which can readily be adjusted with respect to the supporting framework to permit slackening of the belt sufficiently to replace a damaged link with ease, and to provide for precise positioning of the zone of entry of the conveyor links in their passage through an opening in a supporting conveyor tabletop as they pass down and around the back of the driving sprocket.

Another object is to provide a sprocket drive, retainer and takeup device which will be simple in construction, dependable in operation and long-wearing in use.

Other objects, features and advantages of the invention will be apparent from the following description when read with references to the accompanying drawings. In the drawings, wherein like reference numerals denote corresponding parts throughout the several views:

FIG. 1 illustrates, in plan view and with portions broken away, an articulated link belt conveyor equipped with a sprocket drive, retainer and guide mechanism embodying the invention;

FIG. 2 is a longitudinal cross-sectional view taken along the line 2–2 of FIG. 1 in the direction of the arrows and illustrating mechanical details of the combinative sprocket drive, retainer, guide and takeup mechanism;

FIG. 3 is a perspective view, as seen from the underside, of a series of three conveyor links comprising the conveyor belt cooperative with the sprocket drive, retainer, guide and takeup mechanism embodying the invention;

Figure 4:
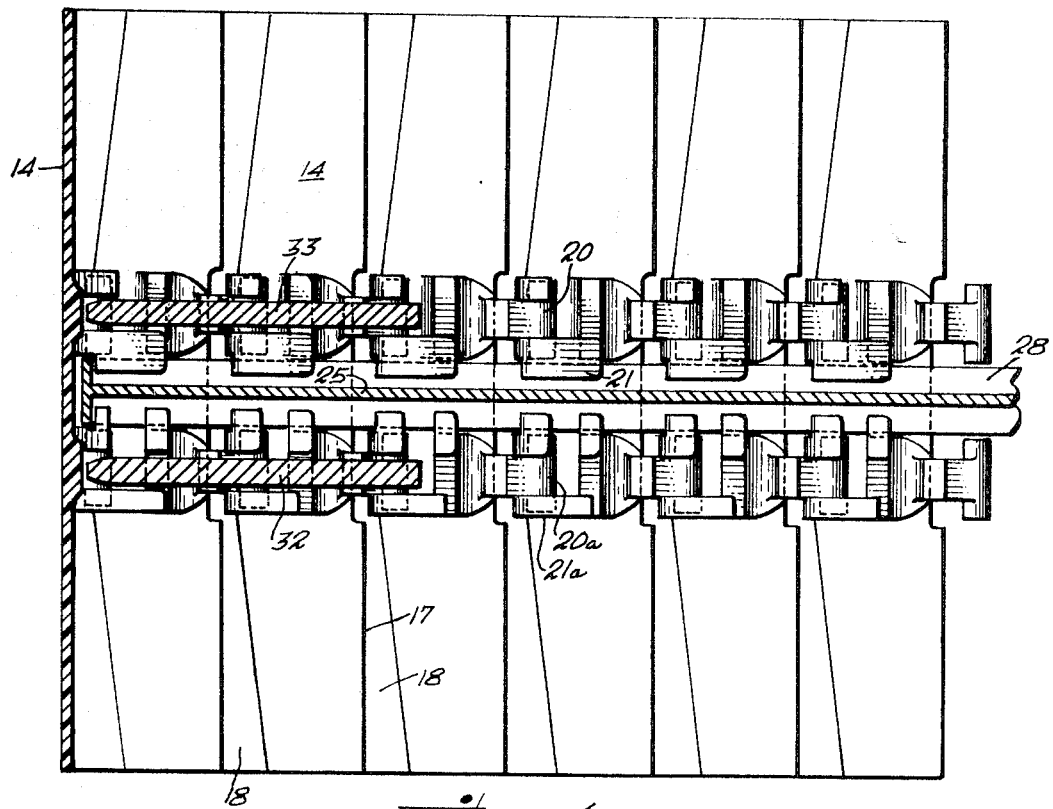
Figure 5:
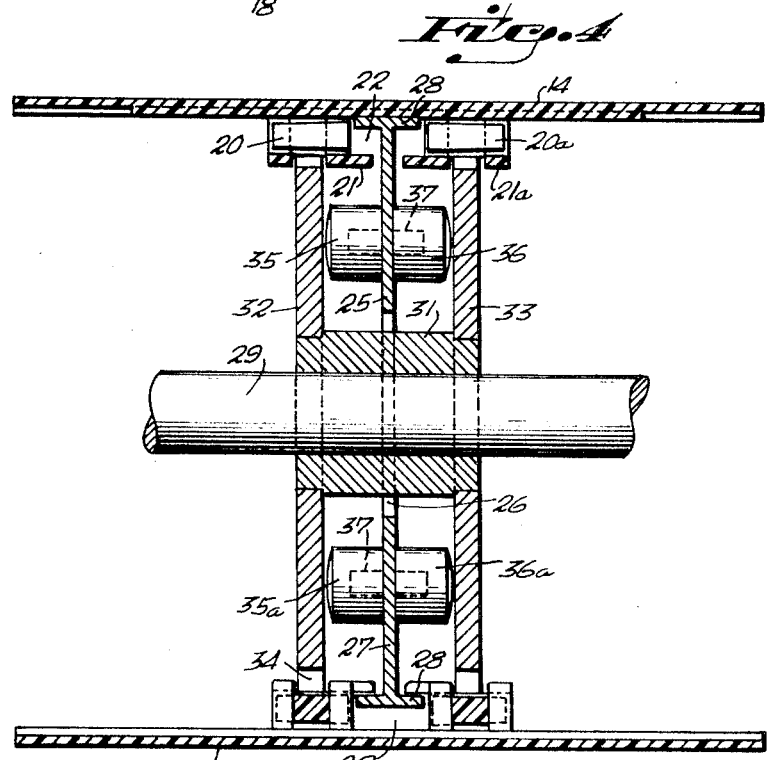

FIG. 4 is a longitudinal cross-sectional view taken along the line 4–4 of FIG. 2 in the direction of the arrows and illustrating how the articulated conveyor belt is guided into the sprocket mechanism for powering the conveyor; and FIG. 5 is a substantially vertical cross-sectional view taken along the broken line 5–5 of FIG. 2 in the direction of the arrows and illustrating mechanical details of the sprocket drive mechanism.

Referring now in detail to the drawings, the numeral 10 in FIG. 1 designates a top or plan view, with portions broken away, of a typical tabletop conveyor embodying the invention. The tabletop assemblage 10 comprises longitudinally extending, opposed, marginal tabletop portions 11, 12 along which there is supported the upper flight of an articulated link conveyor belt 13 comprised of interengaged individual links 14. Since the framework and supporting structure of the tabletop portions 11 and 12 can be of ordinary construction and form no part of the invention herein claimed, they are not further illustrated and described herein. Moreover, inasmuch as the links 14 herein are described in detail in the above-mentioned patent application, only so much thereof is described herein as is deemed necessary to understand the invention herein claimed.

The articulated conveyor links 14 are preferably integrally cast of a strong, lightweight metal or molded of a tough synthetic plastic material, and are formed with a flat top or support surface 15, a front edge 16 and a back edge 17. The underside of the support surface 15 is undercut to provide a marginal recess 18 which tapers forwardly somewhat to each side to accommodate an undercut or recess 19 in the top surface 15 near the front edge thereof. As best illustrated in FIG. 3, link interengaging means comprising a pair of symmetrically spaced, interlocking elements 20, 20a extends downwardly and outwardly of the bottom surface of link 14. Spaced rearwardly of each of the interlocking elements 20, 20a, and also depending from the bottom surface of link 14, are two linking elements 21, 21a for receiving interlocking elements 20, 20a of an adjacent connected link. As is illustrated in FIG. 5, the two linking elements 21, 21a define therebetween a slide passageway 22 of T-shaped cross-sectional configuration for the reception of guide track mechanism along which the articulated link conveyor belt moves, as is hereinbelow more particularly described.

Referring now to FIGS. 2 and 5 of the drawing, the numeral 23 in FIG. 2 designates the sprocket drive, retainer and guide mechanism, generally, the same being comprised of a U-shaped guide track 24 having an upper arm portion 25, an arcuate portion 26 and a lower arm portion 27, all preferably integrally fabricated such as by casting or by stamping or otherwise forming from flat metal plate. The outer edge of the U-shaped guide track 24 has welded or otherwise affixed thereto, centrally along its length, a right-angular outer flange 28 defining with said U-shaped guide track a T-shaped cross-sectional configuration, as is best illustrated in FIG. 5. A drive shaft 29 transversely arranged within the bight 30 of the U-shaped guide track 24 has keyed thereto a central hub 31 concentrically secured to the outer ends of which are a pair of identical, opposed, sprocket wheels 32, 33 formed with peripheral sprocket teeth 34. As means for maintaining the U-shaped guide track 24 substantially centrally positioned between the opposed sprocket wheels 32, 33, said U-shaped track guide has secured thereto in outwardly projecting relation at each side of inner end portions of the upper and lower arm portions 25, 27, thereof, respectively, diametrically-opposed pairs of cylindrical bosses 35, 35a and 36, 36a. The bosses 35, 35a, 36 and 36a may be fixed in place as by being threaded upon screw thread pins 37 welded at their inner ends against side portions of the U-shaped guide track 24. The cylindrical bosses 35, 35a, 36 and 36, 36a are preferably of NYLON or a similar tough, synthetic plastic having a low coefficient of friction, and are slightly rounded at their outer ends and of such length as to confine lateral movement of the assembly comprising the drive shaft 29, the hub 31 and the opposed sprocket wheels 32 and 33 with respect to the U-shaped guide track 24 to close tolerances. The drive shaft 29 is journaled transversely between side portions at one end of the conveyor supporting framework (not illustrated) and is provided with rotative drive means as is hereinafter described.

The articulated link conveyor belt 13 may be guided in its path of travel along its upper flight by an upper flight track 38 (partially illustrated in FIG. 2) supported with respect to the conveyor framework as is hereinafter described. The upper flight track 38 is preferably of I-beam construction to define a T-shaped cross-sectional configuration along its upper end for guidance of the link conveyor belt 13. Similarly, a lower flight track 39 provides for guidance and retention of lower or return flight of the articulated link conveyor belt 13.

Means is provided for adjustably connecting the U-shaped guide track 24 with the upper and lower flight tracks 38, 39, respectively. To this end, the inner edge at the outer end of the upper arm 25 has welded or otherwise affixed thereto, a laterally extending, substantially horizontal attachment plate 40; and the inner edge at the outer end of the lower arm 27 has similarly attached thereto a laterally extending, substantially horizontal lower plate 41. Fixed between the upper and lower plates 40 and 41, respectively, as by respective bolts 42 and 43, is a U-shaped, vertically extending bracket 44. The laterally extending lower plate 41 extends into an outwardly projecting portion 45 which is adjustably secured to the inner flange of the lower flight track 39 as by a plurality of bolts 46. The upper flight track 38 is fixed with respect to the conveyor framework by being bolted to a supporting crossbar 47 as by bolts 48, said crossbar being fixed at each end to the conveyor framework (not illustrated). The bolts 48 also secure, against the underside of the supporting crossbar 47, a right angular bracket 49. One or more bolts 50 (only one shown in FIG. 2) adjustably secure the right-angular bracket 49 of the upper flight track 38 to the vertically extending bracket 44 of the U-shaped guide track 24 through a selected plurality of shims 51. It is to be understood that while the lower flight track 39 extends along the length of the conveyor to the rear or idler end thereof whereat it terminates short of guide wheels 52, 53 (see FIG. 1), the upper flight of the conveyor belt, instead of being carried along the upper flight track 38 as illustrated, could instead be guided in a central rectangular recess in a longitudinal, tabletop portion extending between the illustrated marginal tabletop portions 11 and 12 and integrally journaled therewith. In such alternative construction, the width of the tabletop groove would be slightly greater than the overall width of the link interengaging means 20, 20a and 21, 21a of the individual links, to constrain against lateral movement of the articulated belt in its upper path of travel.

As further illustrated in FIG. 1, guide wheels 52, 53 are carried in spaced relation along an idler shaft 54 transversely journaled with respect to the conveyor framework at the belt return end thereof. The guide wheels 52, 53 have smooth, circular peripheral edges and define a space therebetween slightly greater than the overall width of the link interengaging means 20, 20a and 21, 21a of the individual links to constrain against lateral movement of the articulated belt while at the same time providing for smooth passage thereabout. It is to be understood that while the return guide assemblage comprising the guide wheels 52, 53 and the idler shaft 54 is free to rotate, it may or may not rotate during operation of the conveyor, depending upon the relative frictional drag between the guide wheels and the belt links, and the idler shaft 54 and its bearings.

Referring to FIG. 2, it will be seen that the drive shaft 29 is driven by a drive sprocket 55 secured thereto, preferably at a position to one side of the link conveyor belt 13, for mechanical drive by means of a drive chain 56 (partially illustrated) driven by an electric motor, for example (not illustrated).

In operation, the drive shaft 29 will be positionally adjusted within the bight 30 of the U-shaped guide track 24 by any convenient journaling means (not illustrated) to adjust the relative position of the sprocket wheels 32, 33 with respect to the outer flange 28 of the U-shaped guide track 24 whereat it passes along the arcuate or end portion 26 thereof. Adjustment will be such as to interhookingly guide and retain the belt in driving interengagement with respect to the sprocket wheels 32, 33 without binding, insuring positive drive without slippage or skipping of the belt. The mechanism also provides for easy disassembly, as may be required, to replace individual worn or damaged belt links, for example.

I claim:

1. A sprocket drive, belt retainer and guide mechanism for articulated link conveyor belts, the individual links of which are provided along their undersides with a downwardly offset, longitudinally extending slide surface portion defining an open-ended recess, and further including a recess for the reception of a sprocket tooth, comprising, in combination, a guide track member having an upper track edge portion, a lower track edge portion and an arcuate back edge portion interjoining said upper and lower track edge portions, a flange extending along the outer edges of said guide member and defining therewith a track of substantially (L-shaped) T-shaped cross-sectional configuration to be hookingly received in the slide surface recesses of the articulated link conveyor belt, a drive shaft extending transversely through an opening centrally located with respect to said arcuate back edge portion, said drive shaft carrying fixed thereto a sprocket wheel having sprocket teeth moveable into cooperative engagement with the sprocket teeth recesses of the conveyor belt links, (and) means for rotating said drive shaft for transporting the conveyor belt around the outside of said guide track member, an elongated lower flight track of such cross-sectional configuration as to hookingly engage with the slide surface portions of said links, and means for securing one end of said lower flight track in aligned, adjustably spaced relation with respect to the outer end of said lower track edge portion of said guide track member for receiving and retaining the conveyor belt in its lower flight run after passage around the outside of said guide track member.

2. A sprocket drive, belt retainer and guide mechanism for articulated link conveyor belts, the individual links of which are provided along their undersides with slide passageways of substantially T-shaped cross-sectional configuration and a pair of opposed laterally spaced recesses for the reception of sprocket teeth, one on each side of each said passageways, comprising, in combination, a substantially U-shaped guide track member having an upper arm portion, a lower arm portion and an arcuate portion interjoining said upper and lower arm portions and defining a bight therebetween, a flange extending along the outer periphery of said U-shaped guide member and defining with said upper, arcuate and lower portions thereof a track of substantially T-shaped cross-sectional configuration to be received in the slide passageways of the articulated link conveyor belt, a drive shaft extending transversely through said bight, said drive shaft carrying fixed thereto a pair of spaced, opposed, sprocket wheels having sprocket teeth in cooperative engagement, respectively, with the opposed sprocket teeth recesses of the conveyor belt links, means for rotating said drive shaft for transporting the conveyor belt around the outside of said guide track member, means for constraining axial movement of said drive shaft with respect to said guide track member, said constraining means comprising a pair of abutment members extending laterally outwardly of each side of said U-shaped guide track and terminating in closely-spaced relation with respect to one each of opposed inner sidewall portions of said sprocket wheels.

3. A sprocket drive, belt retainer and guide mechanism for articulated link conveyor belts, the individual links of which are provided along their undersides with slide passageways of substantially T-shaped cross-sectional configuration and a pair of opposed laterally spaced recesses for the reception of sprocket teeth, one on each side of each said passageways, comprising, in combination, a substantially U-shaped guide track member having an upper arm portion, a lower arm portion and an arcuate portion interjoining said upper and lower arm portions and defining a bight therebetween, a flange extending along the outer periphery of said U-shaped guide member and defining with said upper, arcuate and lower portions thereof a track of substantially T-shaped cross-sectional configuration to be received in the slide passageways of the articulated link conveyor belt, a drive shaft extending transversely through said bight, said drive shaft carrying fixed thereto a pair of spaced, opposed, sprocket wheels having sprocket teeth in cooperative engagement, respectively, with the opposed sprocket teeth recesses of the conveyor belt links, means for rotating said drive shaft for transporting the conveyor belt around the outside of said guide track member, means for constraining axial movement of said drive shaft with respect to said guide track member, said constraining means comprising a plurality of pairs of abutment members extending laterally outwardly of each side of said U-shaped guide track, each pair being in transverse alignment and having rounded outer edge portions in closely-spaced relation with respect to one each of the opposed inner sidewall portions of said sprocket wheels.

4. A sprocket drive, belt retainer and guide mechanism for articulated link conveyor belts as defined in claim 3, wherein said abutment members are each of a tough synthetic plastic material having a low coefficient of friction.

5. A sprocket drive, belt retainer and guide mechanism for articulated link conveyor belts, the individual links of which are provided along their undersides with slide passageways of substantially T-shaped cross-sectional configuration and a pair of opposed laterally spaced recesses for the reception of sprocket teeth, one on each side of each said passageways, comprising, in combination, a substantially U-shaped guide track member having an upper arm portion, a lower arm portion and an arcuate portion interjoining said upper and lower arm portions and defining a bight therebetween a flange extending along the outer periphery of said U-shaped guide member and defining with said upper, arcuate and lower portions thereof a track of substantially T-shaped cross-sectional configuration to be received in the slide passageways of the articulated link conveyor belt, a drive shaft extending transversely through said bight, said drive shaft carrying fixed thereto a pair of spaced, opposed, sprocket wheels having sprocket teeth in cooperative engagement, respectively, with the opposed sprocket teeth recesses of the conveyor belt links, means for rotating said drive shaft for transporting the conveyor belt around the outside of said guide track member, an elongated lower flight track of T-shaped cross-sectional configuration, and means for securing one end of said lower flight track in aligned, adjustably spaced relation with respect to the outer end of said lower arm portion of said U-shaped guide track member for receiving and retaining the conveyor belt in its lower flight run after passage around the outside of said guide track member.

6. A sprocket drive, belt retainer and guide mechanism for articulated link conveyor belts as defined in claim 5, including an elongated upper flight track of T-shaped cross-sectional configuration, and means for securing one end of said upper flight track in aligned, adjustably spaced relation with respect to the outer end of said upper arm portion of said U-shaped guide track for guiding the conveyor belt along its upper flight run into interengagement with said upper arm portion for driving interconnection with said sprocket wheels.

7. A sprocket drive, belt retainer and guide mechanism for articulated link conveyor belts as defined in claim 5, including an elongated conveyor support structure, said drive shaft being journaled transversely at one end of said support structure, and an idler shaft journaled transversely at the other end of said support structure, said idler shaft carrying a pair of spaced guide wheels about which the articulated belt turns into its upper flight path of travel.